United States Patent [19]

Canova

[11] Patent Number: 5,479,334
[45] Date of Patent: Dec. 26, 1995

[54] INVERTER FOR THE SUPPLY OF DISCHARGE LAMPS WITH HEATED ELECTRODES, WITH RESONANT CIRCUIT

[75] Inventor: Antonio Canova, Arezzo, Italy

[73] Assignee: Magnetek S.p.A., Siena, Italy

[21] Appl. No.: 187,878

[22] Filed: Jan. 27, 1994

[30] Foreign Application Priority Data

Jan. 29, 1993 [EP] European Pat. Off. ............... 93830025

[51] Int. Cl.⁶ .......................... H02M 3/337; H05B 41/29
[52] U.S. Cl. ...................... 363/56; 363/134; 315/DIG. 5; 315/DIG. 7
[58] Field of Search .................................. 363/55, 56, 97, 363/98, 131–134; 315/DIG. 5, DIG. 7, 190, 205

[56] References Cited

U.S. PATENT DOCUMENTS

| | | | |
|---|---|---|---|
| 4,692,667 | 9/1987 | Nilssen | 363/56 |
| 4,725,762 | 2/1988 | Jagschitz | 363/56 |
| 4,734,624 | 3/1988 | Nagase et al. | 363/132 |
| 4,876,635 | 10/1989 | Park et al. | 363/17 |

Primary Examiner—Peter S. Wong
Attorney, Agent, or Firm—McGlew and Tuttle

[57] ABSTRACT

An inverter for the supply of one or more discharge lamps with heated electrodes includes a load circuit with a series resonant circuit and at least one lamp, two controllable switches and a control circuit for the switches, causing the switches to conduct alternately. A normally isolated dissipative component is connected, when the voltage across the load circuit exceeds a given value, to the load circuit, thus modifying its figure of merit to limit the maximum voltage without varying the resonant frequency of the load circuit.

16 Claims, 2 Drawing Sheets

INVERTER FOR THE SUPPLY OF DISCHARGE LAMPS WITH HEATED ELECTRODES, WITH RESONANT CIRCUIT

FIELD OF THE INVENTION

The invention relates to an inverter for the supply of one or more discharge lamps with heated electrodes.

BACKGROUND OF THE INVENTION

An inverter of this type is described, for example, in Patent EP-B-O, 113, 451. In this patent, a load circuit, comprising a series resonant circuit and a discharge lamp, is associated with a special circuit to prevent the appearance of unacceptable excess voltages across the lamp, particularly in the starter transient. For this purpose, a voltage-dependent resistor and a capacitor are connected together in series, in parallel with a branch comprising the inductance of the resonant circuit. With this arrangement, when the voltage across the lamp exceeds a certain limit value, depending on the variable resistor, the latter becomes conducting. This produces a variation in the resonant frequency of the load circuit, changing it from the supply frequency and consequently limiting the voltage across the lamp.

SUMMARY AND OBJECTS OF THE INVENTION

The present invention relates to a circuit of the type mentioned initially, with a different system of limiting the voltage applied to the lamp.

The invention is substantially based on the concept of using a resonant load circuit in which it is possible to connect a dissipative component, which has no effect on the resonant frequency of the load circuit, but changes its figure of merit.

The inverter according to the invention is therefore substantially characterised by a normally isolated dissipative component, which is connected, when the voltage across the load circuit exceeds a given value, to the load circuit, thus modifying its figure of merit to limit the maximum voltage without varying the resonant frequency of the load circuit.

In a practical embodiment of the inverter according to the invention, there is placed, in a shunt in parallel with a branch containing at least one of the components of the load circuit, a voltage-dependent resistor, in series with a dissipative component of the resistive type, the voltage-dependent resistor becoming conducting at a limit value of the voltage applied across it.

Further advantageous embodiments of the inverter according to the invention are indicated in the attached claims.

The invention will be more clearly understood by an examination of the description and the attached drawing, which shows a practical and non-restrictive embodiment of the invention.

BRIEF DESCRIPTION OF THE PREFERRED EMBODIMENT

Figure 1:
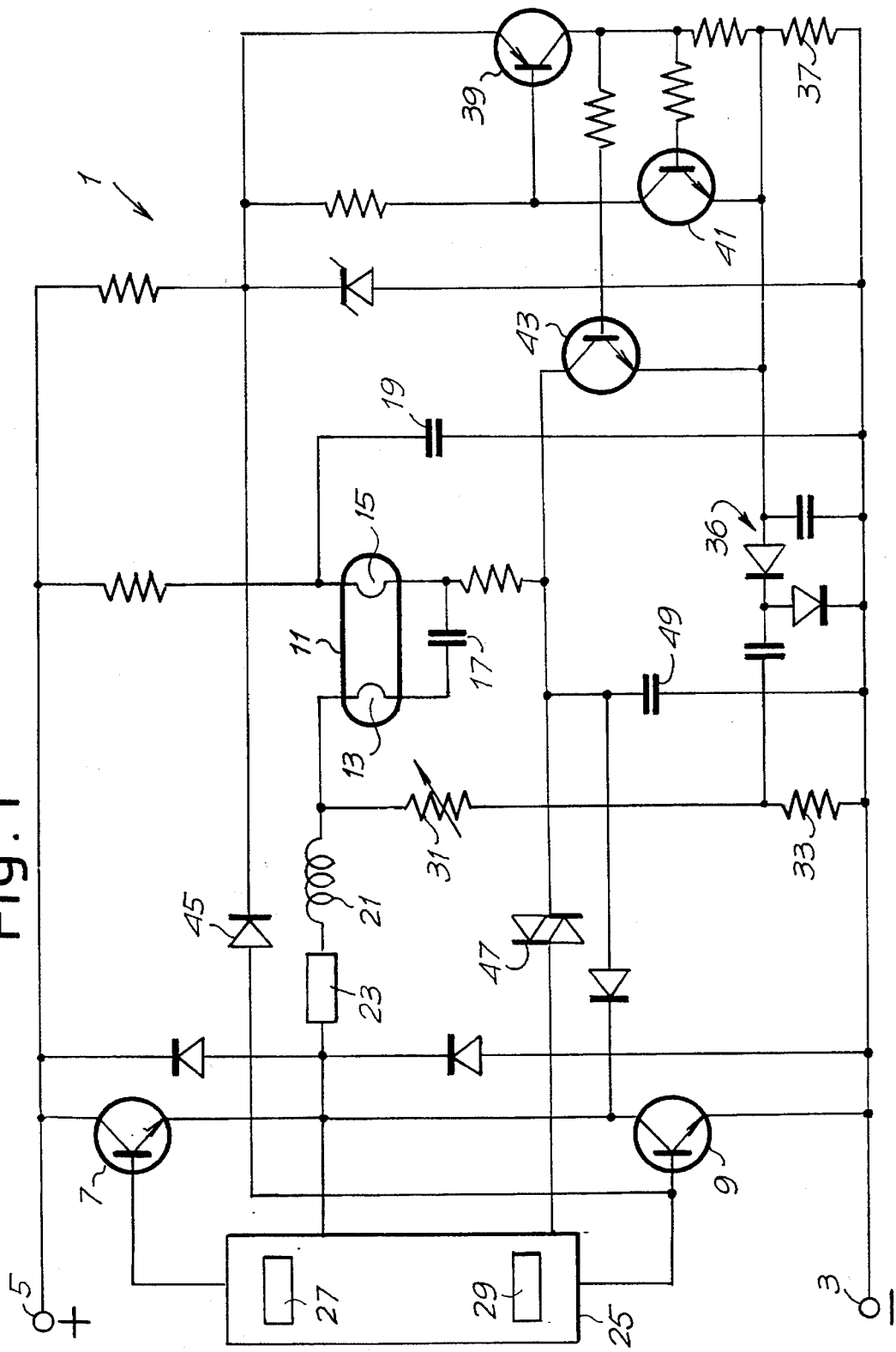
FIG. 1 is a simplified diagram of the circuit, limited to the characteristic parts.

With reference to FIG. 1 initially, the inverter according to the invention, indicated as a whole by 1, has two terminals 3 and 5, for connection to a source of direct voltage. This may be taken from a power supply circuit (not shown, and known per se), which is connected to an alternating voltage mains and which may comprise, for example, a filter, a rectifier and a DC/DC converter for the correction of the power factor.

The two terminals 3 and 5 are connected to two transistors 7 and 9, acting as switches controlled in the way described below. A discharge lamp 11, equipped with two heated electrodes 13 and 15, is connected in a shunt in parallel with the transistor 9. The electrodes 13 and 15 are connected together by a capacitor 17. The lamp 11 is connected to the emitter of the transistor 9 through a further capacitor 19, and to the collector of the transistor through an inductance 21 in series with the primary winding 23 of a saturable transformer.

The circuit comprising the lamp 11, the capacitor 17, the capacitor 19, the inductance 21 and the primary winding 23 forms a resonant load circuit whose resonant frequency remains unchanged even during transients, as will be made clear by the following description, and is determined by the value of the inductances and capacitances present in it.

The two transistors 7 and 9 are caused to conduct alternately by means of a control system 25 of a type known per se, comprising two secondary windings, indicated by 27 and 29, of the saturable transformer, whose primary winding is indicated by 23. The secondary windings 27 and 29 supply the control voltages of the transistors 7 and 9.

The operating frequency of the inverter described up to this point is close to (and slightly greater than) the resonant frequency of the LC circuit comprising the components 17, 19 and 21, but is such that the voltage across the lamp 11 is kept below a safety value. The parameters of the individual circuit components are calculated for this purpose. However, excessive voltages may occur during the starter transient or in the case of defective operation of the lamp. In order to avoid this phenomenon, the circuit according to the invention has a variable resistor (VDR) 31, which becomes conducting only when a voltage above a threshold value is present across it. The variable resistor 31 is connected in series with a resistor 33 and forms a shunt in parallel with the branch comprising the inductance 21, the primary winding 23 and the switch 9.

When the voltage across the lamp 11 and consequently across the variable resistor 31 exceeds the threshold value, the variable resistor becomes conducting, and consequently the load circuit connected to the switches 7 and 9 is no longer formed by the components 11, 17, 19, 21, and 23 alone, but also includes the additional dissipative member formed by the resistor 33 (in addition to the resistor 31 itself). This reduces the figure of merit of the load circuit and consequently decreases the value of the voltage across the lamp 11, but does not affect the resonant frequency of the circuit, which remains unchanged. The damping provided by the resistive component is such that the voltages concerned are kept below the safety values even when the operating frequency is very close to the resonant frequency.

Figure 2:
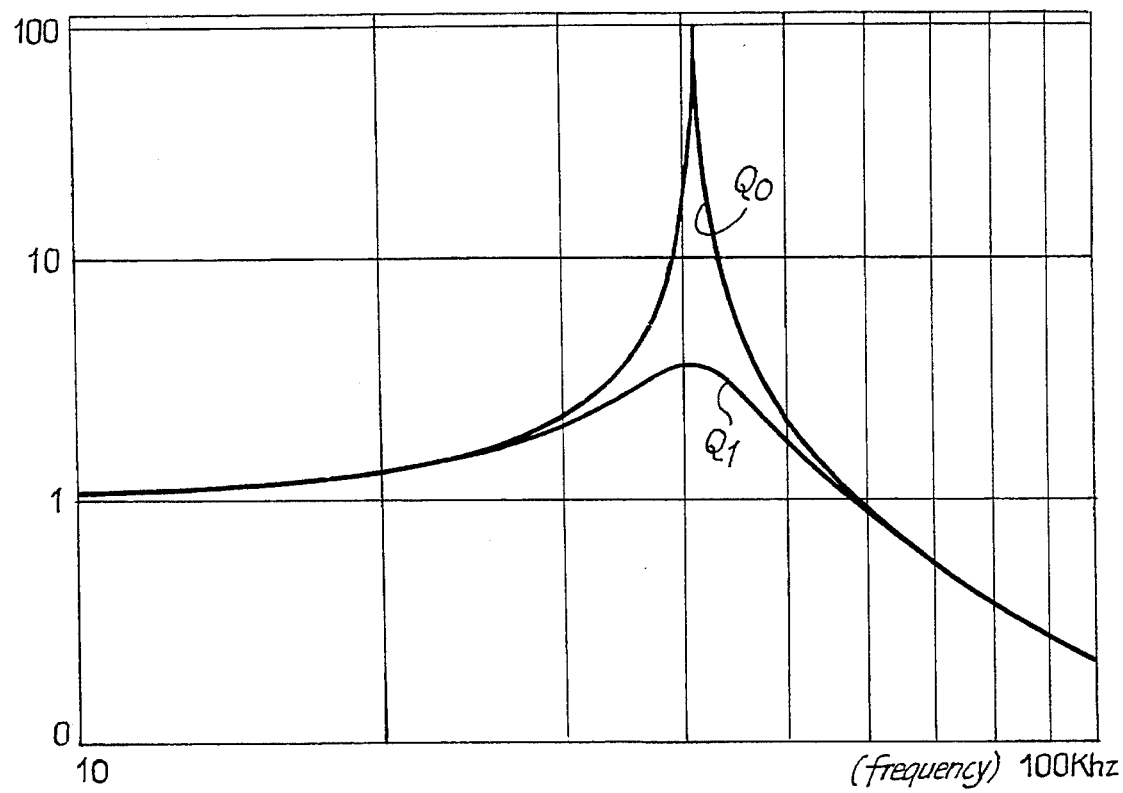
FIG. 2 shows the variation in the figure of merit of the resonant circuit and the effect of the voltage limiting device.

FIG. 2 shows the variation in the figure of merit Qo in the absence of the dissipative component formed by the dissipative shunt 31, 33, and the variation in the figure of merit Q1 when the resistor 31 is conducting.

The horizontal axis shows the frequency in kHz, while the vertical axis shows the ratio between the voltage across a reactive component of the oscillating circuit and the supply voltage. The numerical values shown are for guidance only.

In the embodiment illustrated in FIG. 1, the supply system also has a monitoring device comprising: a peak-to-peak detector indicated as a whole by 36, to which are connected a resistor 37, transistors 39, 41, and 43, and a diode 45. The monitoring circuit locks the inverter when the dissipative component 33 remains in the circuit for a period greater than a limit period determined by the time constants of the peak-to-peak detector circuit.

When the voltage across the load increases, the voltage across the resistor 37 also rises. When a given threshold value is exceeded, the transistors 39 and 41 become conducting. Consequently the transistor 43 also becomes conducting. This causes the control circuit to be disabled in two ways:

1) through the diode 45, the potential of the base circuit of the transistor 9 of the inverter is decreased to a value which causes it to cut off;

2) through the transistor 43, the diac 47, which is used to trigger the starting of the inverter, is kept in the off state.

It is to be understood that the drawing shows only one example provided solely as a practical demonstration of the invention. This invention may be varied in its forms and arrangements without thereby departing from the scope of the guiding principle of the invention. Any reference numbers in the attached claims has the purpose of facilitating the reading of the claims with reference to the description and to the drawing, and does not restrict the scope of the protection represented by the claims.

In particular, the lamp 11 and the series resonant circuit may be connected in a shunt in parallel with the transistor 7, in other words in the upper part of the device, instead of in a shunt in parallel with the transistor 9.

Figure 3:
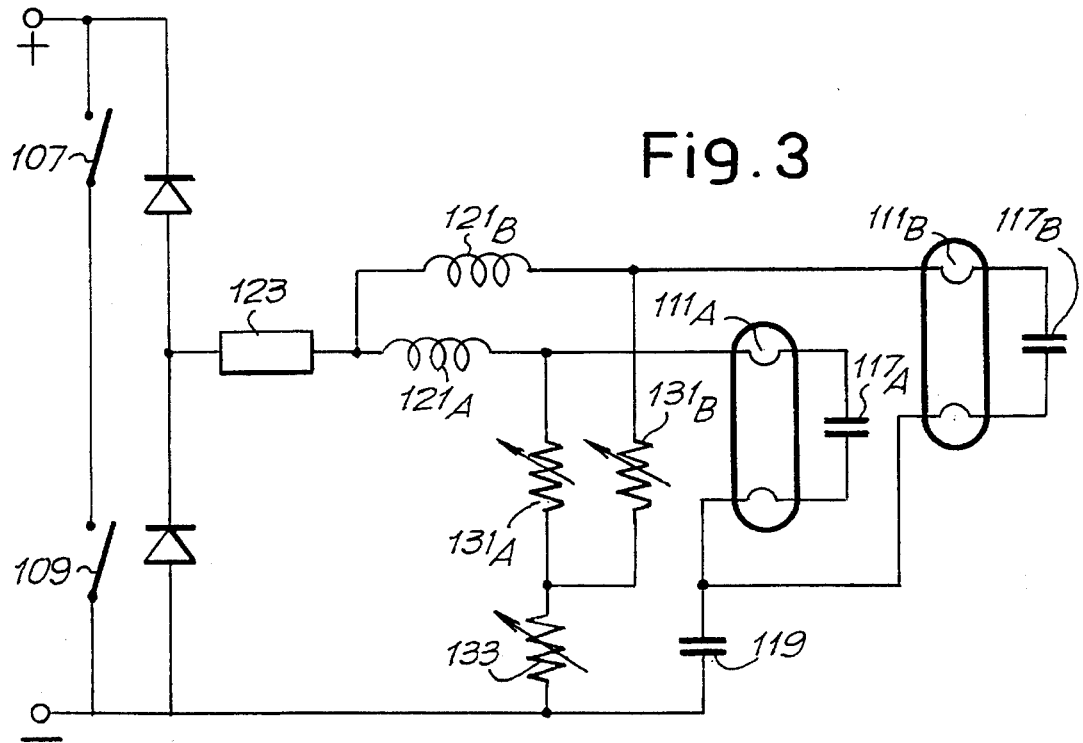
FIG. 3 is a highly schematic view of a version with two lamps.

The inverter may also supply more than one lamp at the same time, as shown schematically in FIG. 3 for two lamps 111A and 111B. In this case, a single capacitor 119, common to the two lamps 111A and 111B, is used, with a variable resistor, 131A and 131B respectively, for each lamp. In this case, the variable resistors are connected in series to a common dissipative component 133, corresponding to the resistor 33. The diagram in FIG. 3 also shows the two switches 107 and 109, corresponding to the transistors 7 and 9; the two impedances 121A and 121B of the resonant circuits of the two lamps; the primary winding 123, corresponding to the winding 23; and the capacitors 117A and 117B which connect the electrodes of each lamp.

I claim:

1. Inverter for the supply of one or more discharge lamps with heated electrodes comprising: a load circuit with a series resonant circuit and at least one lamp, two controllable switches and a control circuit for said switches, causing said switches to conduct alternately, a normally isolated dissipative component, which is connected, when a voltage across the load circuit exceeds a given value, to the load circuit, thus modifying its figure of merit to limit a maximum voltage without varying a resonant frequency of the load circuit.

2. Inverter according to claim 1, wherein:

a shunt is placed in parallel with a branch containing at least one of the components of said load circuit, a voltage-dependent resistor in series with said dissipative component, said voltage-dependent resistor becoming conducting at a limit value of the voltage applied across it.

3. Inverter according to claim 2, wherein:

said shunt is placed in parallel with a branch comprising an inductive component of the load circuit.

4. Inverter according to claim 2, wherein:

the shunt is placed in parallel with an inductive component and with one of the controllable switches.

5. Inverter according to claim 1, further comprising:

another lamp and another resonant circuit, said dissipative component being connected to and normally isolated from said another resonant circuit.

6. Inverter according to claim 5, further comprising:

a voltage dependent resistor in series with said dissipative component:

another voltage-dependent resistor, said another voltage-dependent resistor, being in series with said dissipative component.

7. Inverter according to claim 1, further comprising:

a voltage monitoring circuit for cutting off the control circuit of the switches when the dissipative component is connected for a period greater than a predetermined time interval.

8. Inverter according to claim 1, further comprising:

inverter starting means for triggering the starting of the inverter;

semiconductor means which, when the voltage across the load circuit exceeds another given value for a period greater than a predetermined time interval, become conducting and cut off the switches and the inverter starting means.

9. An inverter for a discharge lamp, the inverter comprising:

a load circuit, said load circuit including a series resonant circuit connectable to the lamp, said load circuit also including two controllable switches and control circuit means for causing said two controllable switches to conduct alternately;

a normally isolated dissipative component means for connecting to said load circuit only when a voltage across said load circuit exceeds a given value, said normally isolated dissipative component means modifying a figure of merit of said load circuit and limiting a maximum voltage of said load circuit while maintaining a resonant frequency of said load circuit.

10. An inverter in accordance with claim 9, further comprising:

a voltage dependent resistor in series with said normally isolated dissipative component means, said voltage dependent resistor and said normally isolated dissipative component means form a shunt being in parallel with a portion of said load circuit, said voltage dependent resistor becoming conducting at a limit value of voltage applied across said voltage dependent resistor.

11. An inverter in accordance with claim 10, wherein:

said load circuit includes an inductive component;

said shunt is in parallel with said inductive component.

12. An inverter in accordance with claim 10, wherein:

said load circuit includes an inductive component;

said shunt is in parallel with said inductive component and one of said controllable switches.

13. An inverter in accordance with claim 9, wherein:

said load circuit includes another series resonant circuit connectable to another lamp.

14. An inverter in accordance with claim 13, further comprising:

another voltage dependent resistor in series with said normally isolated dissipative component means.

15. An inverter in accordance with claim 9, further comprising:

a voltage monitoring circuit for disabling said control circuit when said normally isolated dissipative component means is connected for longer than a predetermined time interval.

16. An inverter in accordance with claim 9, further comprising:

inverter starting means for triggering a starting of the inverter;

semiconductor means for becoming conducting and disabling both said controllable switches and said inverter starting means when another voltage across said load circuit exceeds another given value for longer than a predetermined time interval.

* * * * *